(12) United States Patent
Abbey

(10) Patent No.: US 6,438,187 B1
(45) Date of Patent: Aug. 20, 2002

(54) PHASE PROCESSOR FOR DATA PATTERN CORRELATOR

(75) Inventor: Duane L. Abbey, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/256,424

(22) Filed: Feb. 23, 1999

(51) Int. Cl.[7] .................................................. H04L 7/00
(52) U.S. Cl. ........................ 375/368; 375/343; 370/514
(58) Field of Search ................................. 375/367, 368, 375/145, 149, 343, 365, 366; 370/515, 514

(56) References Cited

U.S. PATENT DOCUMENTS 4,409,684 A * 10/1983 Pooch et al. ................ 375/368
4,414,676 A * 11/1983 Kraul et al. ................. 375/368

OTHER PUBLICATIONS

Horowitz et al, "The Art of Electronics", published by Cambridge University Press in 1980, p. 357.*

* cited by examiner

*Primary Examiner*—Chi Pham
*Assistant Examiner*—Phuong Phu
(74) *Attorney, Agent, or Firm*—Nathan O. Jensen; Kyle Eppele

(57) ABSTRACT

A status phase processor for a data pattern recognizer or correlator provides an optimized synchronization signal. The synchronization signal can be utilized to adjust the data sampling clock. The data pattern correlator utilizes two or more samples per symbol of the signal which is expected to be received. The system provides high accuracy correlation without significant hardware and software overhead. The status phase processor relies on a counter circuit and a logic circuit for generating the synchronization signal.

8 Claims, 5 Drawing Sheets

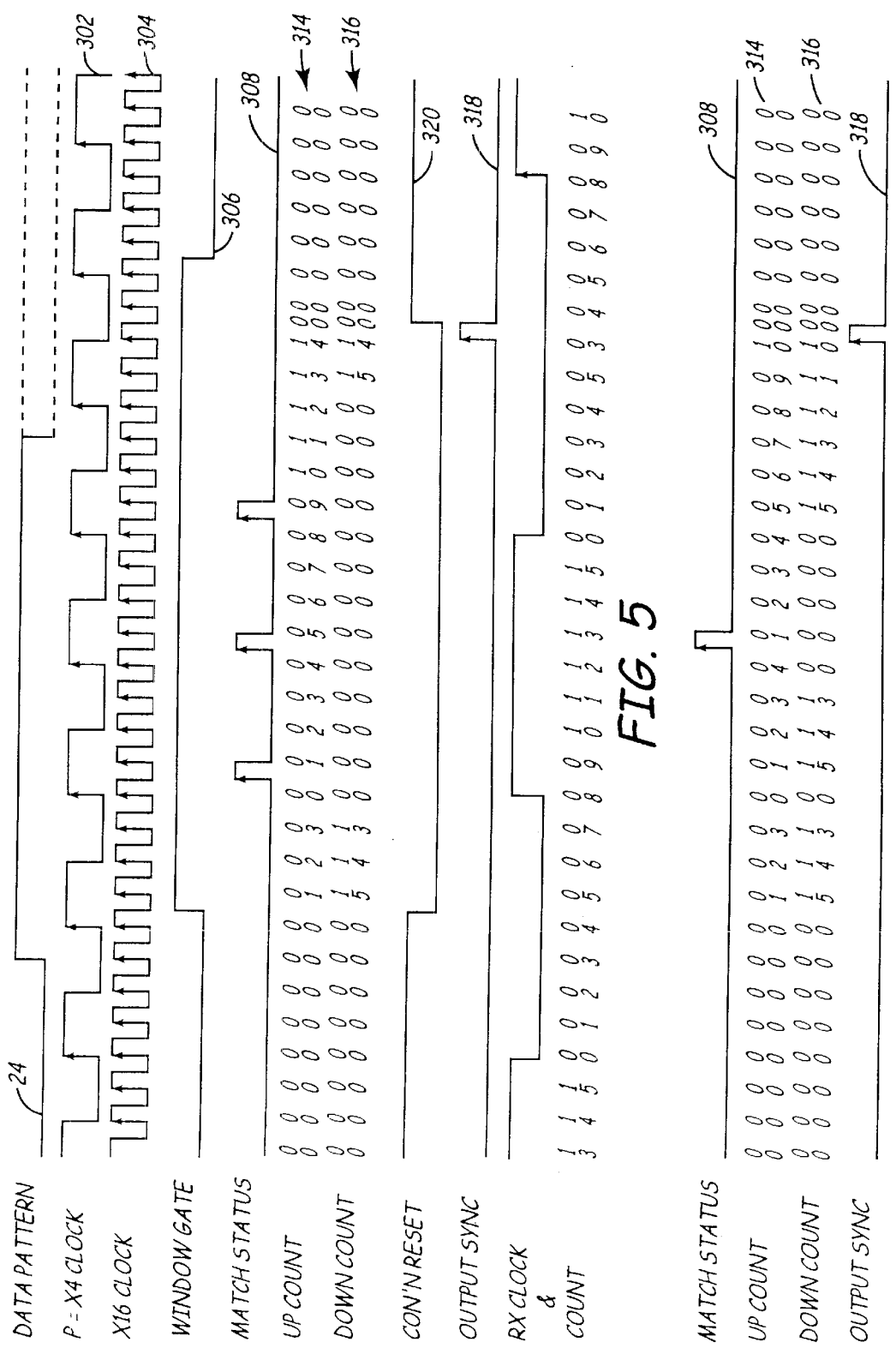

PHASE PROCESSOR FOR DATA PATTERN CORRELATOR

CROSS REFERENCE TO RELATED PATENT APPLICATIONS

The present application is related to U.S. application Ser. No. 09/255,926 filed on an even date herewith, by Duane Abbey, entitled "Data Pattern Correlator".

FIELD OF THE INVENTION

The present invention relates generally to communication systems. More particularly, the present invention relates to a phase processor for a data pattern recognizer. The phase processor generates a synchronization signal for adjusting a data acquisition clock.

BACKGROUND OF THE INVENTION

Data pattern recognizers or correlators are generally utilized in various communication systems to determine if a particular pattern has been received. Once the data pattern is recognized, the correlator provides a time registration or synchronization signal. The synchronization signal is utilized to coordinate the reception of data or information relative to the particular pattern.

Correlators, such as, binary correlators, are utilized for A/J (spread spectrum) message and other data message synchronization. In an exemplary radio system application, a data pattern correlator analyzes the received radio signal to determine if a particular data pattern is present. The data pattern can be comprised of a number of symbols, such as, digital bits, or other indicators, provided in series on a particular radio channel. After the radio system determines that the particular pattern is present, it can then receive further information, such as, data, voice, or other symbols, in accordance with a synchronized communication technique. The data pattern and information can be modulated on the radio signal via any suitable technique, including amplitude modulation, phase modulation, frequency modulation, quadrature amplitude modulation, frequency shift key modulation, or other technique.

Conventional data pattern recognizers have utilized match-filtering techniques which can be susceptible to false pattern recognition due to noise, especially when the data pattern is short. Typically, conventional data pattern recognizers or correlators have increased the size of the data pattern to decrease the occurrence of false pattern recognition. However, increasing the data pattern size presents other problems with pattern recognition performance. Longer data patterns require increased hardware overhead and communication time for recognition. More communication time adversely affects minimum signal dwell times (maximum hop rates) message access times, and message turn-around time periods. In addition, longer correlators become susceptible to missed recognitions due to symbol rate differences between the received signal and the correlator symbol rate clock.

Conventional data pattern recognizers or correlators oversample the incoming signal and compare only one sample of the incoming signal to each symbol in the data pattern (e.g., samples are compared to symbols on a one-to-one basis). With this conventional approach, the only way to improve performance at a constant false recognition rate is to increase the number of characters in the data pattern. As stated above, such a solution has significant disadvantages.

In a conventional system, if all samples of the oversampled incoming signal are compared to each symbol (e.g., multiple samples per symbol or character), any performance gained is reduced by inaccuracies due to channel non-linearities and to doppler shift (difference between the received symbol rate and the correlator's symbol rate). Therefore, comparing all of the samples to each symbol also has significant disadvantages.

Heretofore, current time registration techniques also suffer in deficiencies and accuracy (generally from ±½character or more), due to software processing time, character uncertainty, and low accuracy correlation phase sorting. Further, several data characters can be lost immediately after the pattern recognition due to the slow response time of current correlator techniques.

Thus, there is a need to improve data pattern recognition performance for a given number of pattern characters and maintain a low constant false match rate due to noise. Further, there is a need to perform data correlation utilizing multiple samples per character. Further still, there is a need for greater synchronization reliability in communication applications. Further still, there is a need for an accurate, low cost phase processor for a data correlator.

SUMMARY OF THE INVENTION

The present invention relates to a status processor for generating a synchronization signal. The synchronization signal synchronizes a data sampling clock. The status processor includes a matched status input and a control circuit. The matched status input receives a matched status signal indicating a pattern match of at least one phase of an incoming signal to a data pattern. The control circuit is coupled to the matched status input and includes a counter circuit and a logic circuit. The counter circuit performs a count operation in response to a counter signal generally having a frequency of at least two times the phase rate (sample rate) of the data symbols and in response to the matched status signal. The logic circuit generates the synchronization signal in response to the count operation to adjust the data sampling clock in accordance with the match status signal.

The present invention further relates to a status processor for use in a data pattern correlator. The data pattern correlator provides a matched status signal indicating a pattern match of at least one phase of an incoming signal to a data pattern. The incoming signal is provided in accordance with a data sampling clock. The status processor includes a counter circuit and a logic circuit. The counter circuit performs a count operation in response to a counter signal generally having a frequency of at least two times the phase rate (sample rate) of the data symbols and in response to the matched status signal. The logic circuit is coupled to the counter circuit and controls the counter circuit. The logic circuit generates the synchronization signal in response to the count operation to adjust the sampling clock in accordance with the match status signal.

The present invention still further relates to a status processor for use in a data pattern correlator. The data pattern correlator provides a matched status signal indicating a pattern match of at least one phase of an incoming signal to a data pattern. The incoming signal is provided in accordance with a data sampling clock. The status processor includes a counter means for performing a count operation and a logic means for generating the synchronization signal. The count operation. is performed in response to a counter signal generally having a frequency of at least 2 times the phase rate (sample rate) of the data symbols and in response to the match status signal. The synchronization signal is generated in response to the count operation to adjust the data sampling clock in accordance with the match status signal.

BRIEF DESCRIPTION OF THE DRAWINGS

Preferred exemplary embodiments of the present invention will hereafter be described with reference to the accompanying drawings, wherein like numerals to denote like elements and:

FIG. 5 is an exemplary timing diagram showing the production of a synchronization signal in response to 3 match status pulses; and FIG. 6 is a timing diagram showing the generation of the synchronization signal in response to a single match status pulse

DETAILED DESCRIPTION OF THE PREFERRED EMBODIMENTS

Figure 1:
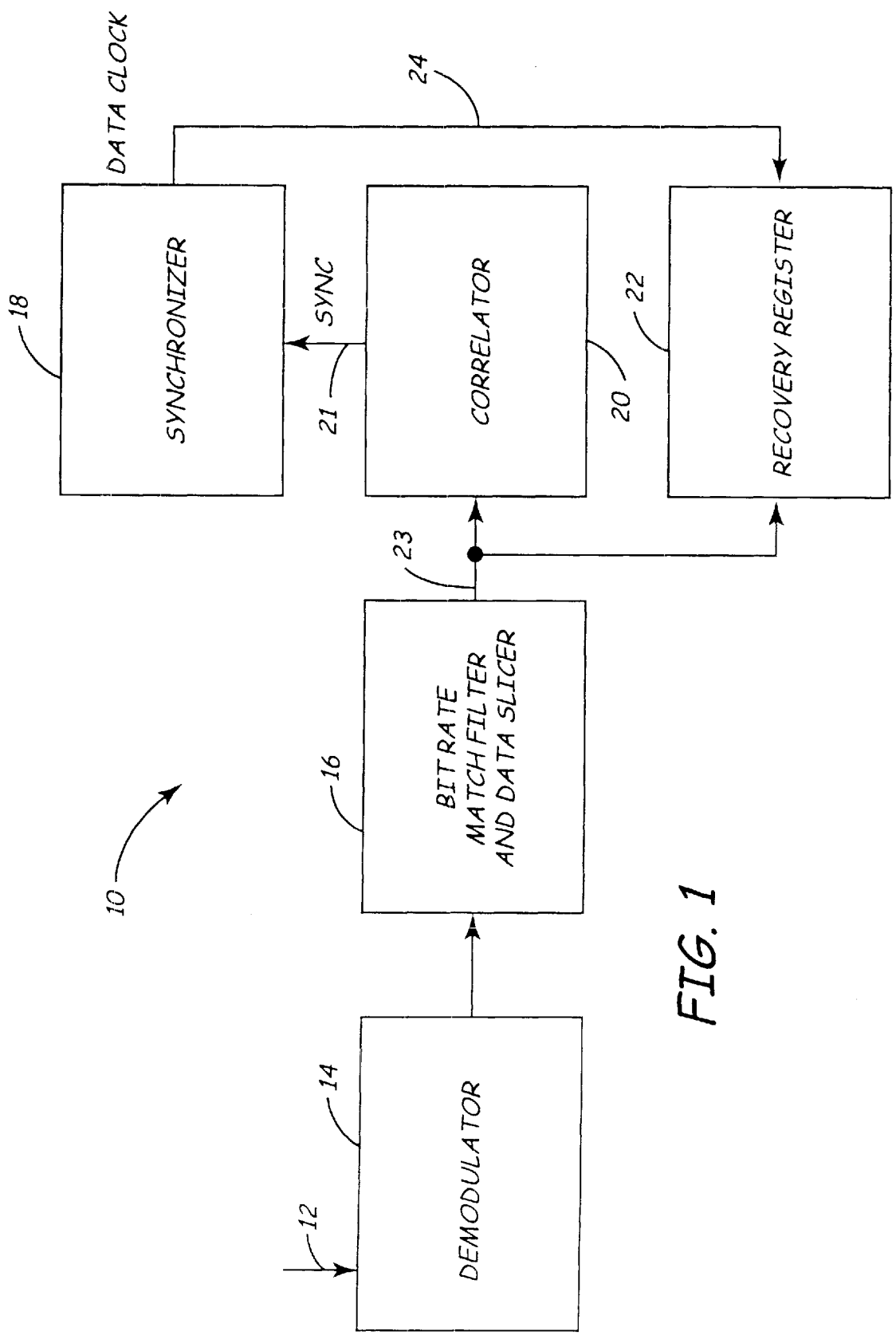
FIG. 1 is a general block diagram of a communication system in accordance with a preferred exemplary embodiment of the present invention.

With reference to FIG. 1, a communication system 10 includes a demodulator 14, a match filter and data slicer 16, a synchronizer 18, a correlator 20, and a recovery register 22. Match filter 16 is preferably a bit rate match filter. Signal input 12 can be coupled to an RF antenna and receiver, a satellite dish and receiver, a telephone line, a cable, or any appropriate medium for providing a signal to demodulator 14.

System 10 can be any type of electromagnetic or optical communication system employing the reception of data characters. System 10 is preferably employed in a receiver for a radio unit.

The signal at input 12 can be a radio signal, an optical signal, a modem signal, or any type of signal capable of communicating information in data character form. The information may be provided on the signal through any of various modulation techniques, including quadrature amplitude modulation (QAM), frequency modulation (FM), amplitude modulation (AM), frequency shift key modulation (FSKM), or other coding techniques. Demodulator 14 demodulates the signal and provides a sequential stream of data or bits to match filter 16. Demodulator 14 can provide the data signal as characters, symbols, binary data, or other orientation. Demodulator 14 can include a discriminator or amplitude detector. Demodulator 14 preferably provides a binary bit stream to match filter 16. Symbols may be represented as bit groupings in the serial stream.

Filter 16 is configured to filter the signal which is being received by system 10. Filter 16 includes a sampler which over-samples the filtered and sliced to logic level signal at a rate of typically four times the data rate associated with the demodulator output. The data rate refers to the number of bits or symbols per second provided on the signal from demodulator 14 to match filter 16. The sampler provides filtered bit or symbol samples at output 23 of filter 16 to correlator 20 and to recovery register 22.

Correlator 20 receives the samples and provides a synchronization signal indicative of whether, and where, a particular data pattern exists in the stream of data at output 23. In this way, synchronizer 18 utilizes the synchronization signal to calibrate a data clock signal at data clock output 24. Recovery register 22 utilizes the data clock signal to appropriately receive data at output 23. Thus, correlator 20 ensures that the signals on output 23 are read at times of maximum signal-to-noise ratio and correctly aligned with the output register, thereby increasing the accuracy of the data received by register 22. Register 22 preferably includes one or more flip-flops or other storage elements that receive data when clocked by the data clock signal.

Synchronizer 18 can be any type of clock adjustment circuit, such as, a counter having a preset input. The counter receives the sampling clock utilized by filter 16 to provide samples at output 23. The counter counts a predetermined number of pulses of the sampling clock before providing a transition that is utilized as the data clock signal. The counter is preset when the synchronization at synchronization signal output 21 is received. Thus, correlator 20 can adjust the transitions of the data clock signal by utilizing the synchronization signal.

Correlator 20 advantageously utilizes more than one sample per bit in the data pattern. Correlator 20 quickly and accurately can produce the synchronization signal. Preferably, only the center or middle samples are utilized, thereby ensuring most accurate sensing of the correct data or symbol states in the signal. For example, by utilizing the middle 8 of 16 samples per bit or symbol, performance can be improved over six orders of magnitude for a nine-bit pattern over conventional one sample per bit or symbol correlators.

Figure 2:
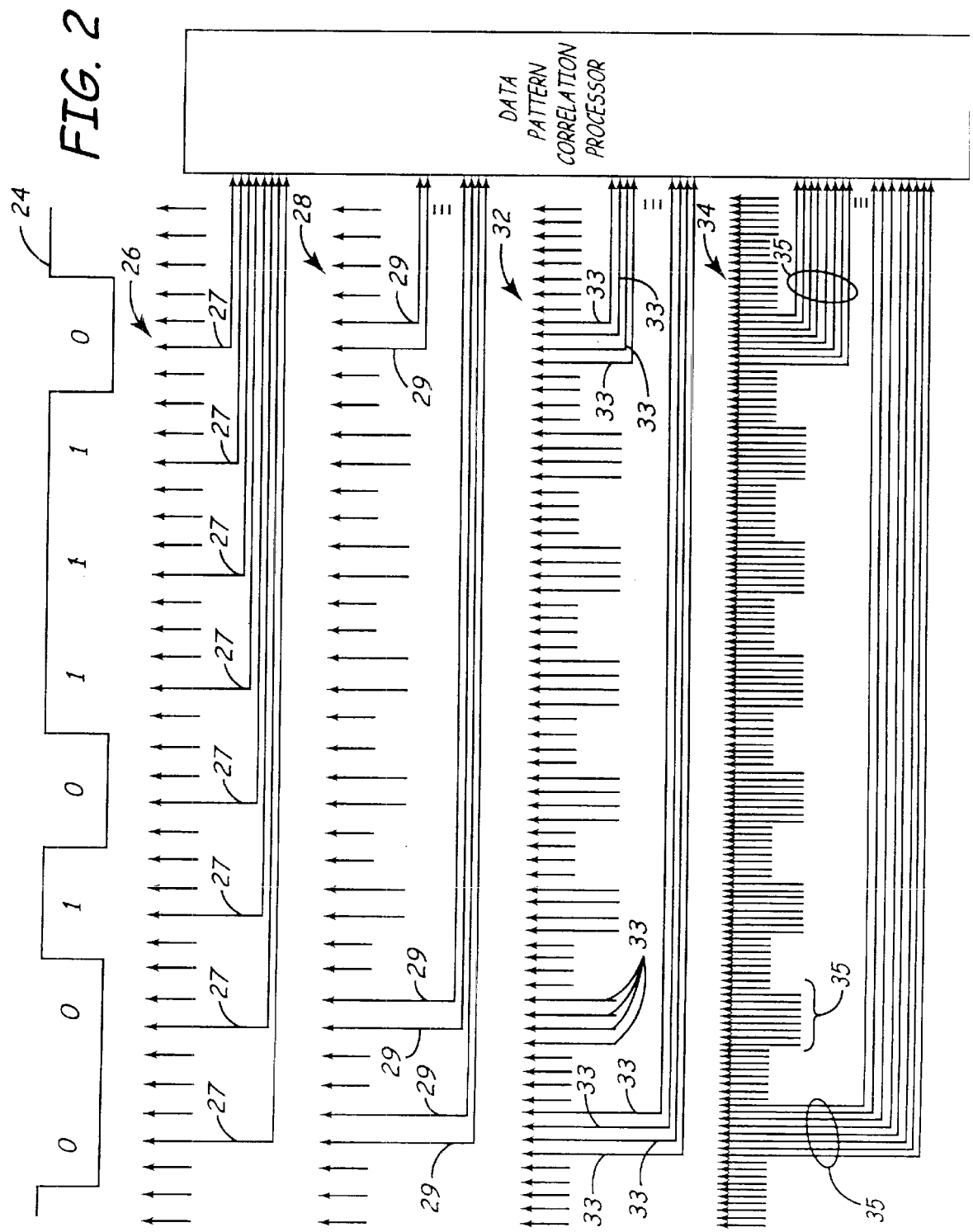
FIG. 2 is a block diagram of the correlator illustrated in FIG. 1, in accordance with another exemplary embodiment of the present invention, shown receiving phases of a signal.

With reference to FIG. 2, data pattern recognizer or correlator 20 receives a data signal 24. Data signal 24 is provided at output 23 from match filter 16 (FIG. 1). Signal 24 in this illustration includes an eight-bit data pattern comprised of bits 00101110. Signal 24 can be sampled at any number of sampling rates and can have any length of symbol pattern. Preferably, signal 24 is sampled at a rate of at least four times the data clock rate (e.g., at least four times per symbol).

Correlator 20 can be configured to analyze one or more of the samples per bit or symbol from filter 16. For example, FIG. 2 schematically illustrates samples 26 with an arrow symbol. Samples 26 include four samples 26 per symbol or bit of signal 24. Samples 26 are spaced evenly in time from each other. A selected sample 27 of every four samples 26 is analyzed by processor 20 to determine if the data pattern is present.

In another embodiment, samples 28 also include four samples per symbol of signal 24. However, correlator 20 analyzes two selected samples 29 of samples 28. Samples 29 are preferably middle, adjacent samples. By utilizing middle samples, such as, samples 29, sensitivity is maximized as samples 28 of signal 24 slide through correlator 20.

In yet another embodiment, samples 32 include eight samples per symbol, and four selected samples 33 per symbol are analyzed by processor 20. In still another embodiment, samples 34 include sixteen samples per symbol, and eight selected samples 35 are analyzed by processor 20.

When processor 20 utilizes adjacent selected samples groupings 27, 29, 33, and 35 both high-sensitivity and low-false start rates are progressively improved, even though the data pattern length is relatively small. This is due to the fact that the noise corrupting the center of the bits or symbols is largely uncorrelated with the data. Computer simulations and laboratory correlator demonstrations with random noise corrupted data backs up this assertion. The given bit samples are preferably adjacent to maximize sensitivity on at least one correlation sample set as samples 28, 32, and 34 slide through processor 20. Transmit and receive system non-linearities, frequency offsets, and bandwidth limitations can cause the signal-to-noise (s/n) ratios to decrease as data samples move out from the center to the edges of the received data bit associated with signal 24. In addition, the noise corruption becomes more correlated with the data, lessening the benefit of multiple correlation samples per given bit or symbol. Therefore, utilizing all samples per bit (e.g., four samples of sample 28) generally does not further increase performance. Samples 32 and 34 increase the rate of over-sampling to keep the span of each bit sample cluster at no more than a one-half bit interval.

Figure 3:
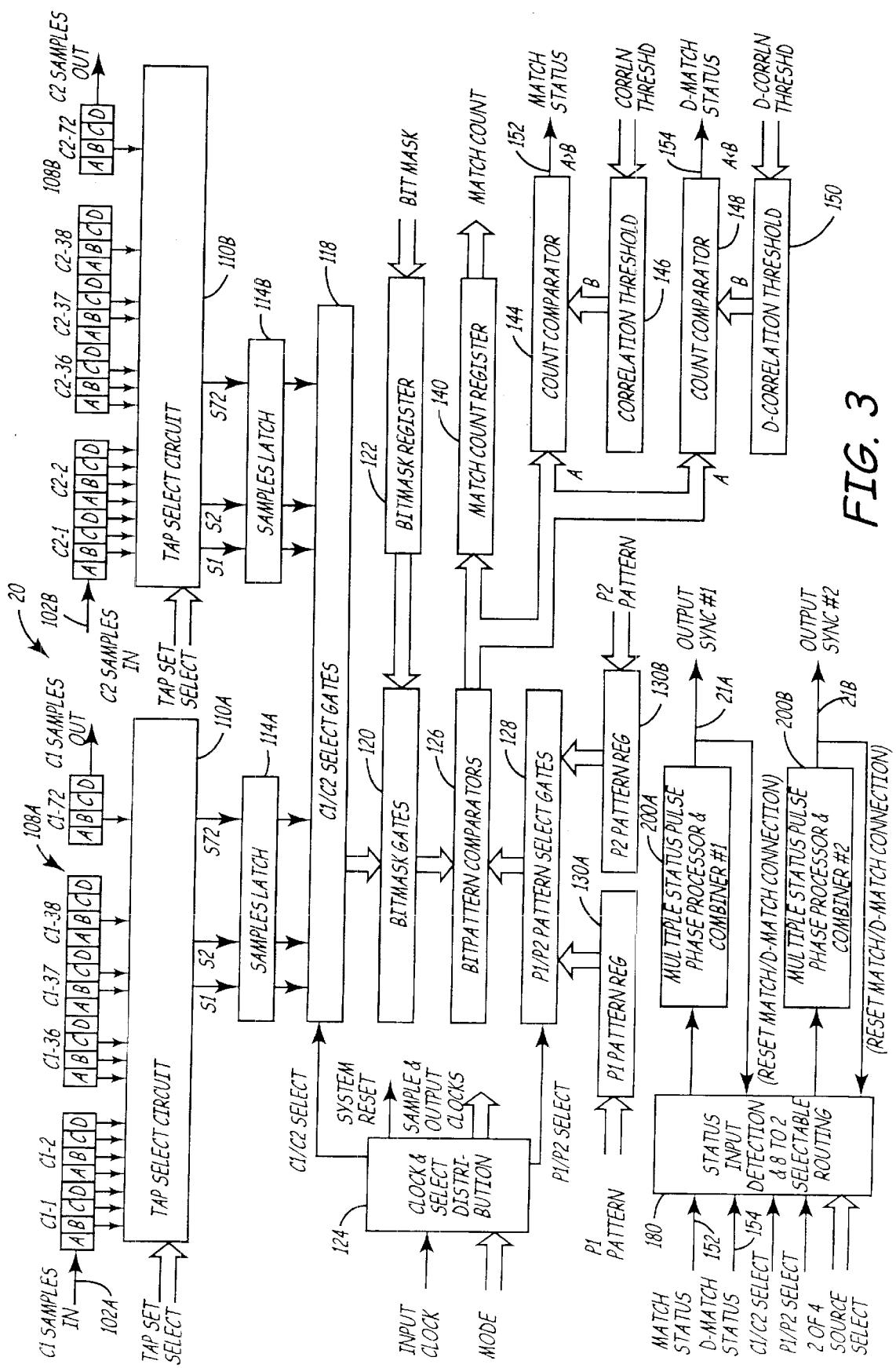
FIG. 3 is a more detailed block diagram of the correlator illustrated in FIG. 2 in accordance with yet another exemplary embodiment of the present invention, including status pulse phase processors.

With reference to FIG. 3, one potential embodiment of correlator 20 is shown as a dual correlator with time shared comparators having a channel A and a channel B. Correlator 20 includes inputs 102A–B, shift registers 108A–B, tap select circuits 11A–B, sample latches 114A–B, select gate circuit 118, bit mask gate circuit 120, bit mask register 122, clock and select distribution circuit 124, bit pattern comparator 126, pattern select gate circuit 128, pattern registers 130A–B, match count register 140, count comparator 144, and match status output 152. Additionally, correlator 20 includes correlation threshold register 146, count comparator 148, decorrelation threshold register 150, multiple status pulse phase processors 200A–B, synchronization outputs 21A–B, status input detection and routing circuit 180, and dematch status 154. Correlator 20 can be implemented in a programmable gate array, a programmable circuit, an ASIC, or a dedicated circuit. Alternatively, correlator 20 can be a processor operating a software program.

The operation of correlator 200 will be discuss with reference to channel A, represented by reference numbers having a suffix ending in A. Channel B is substantially the same as channel A and is shown in an exemplary fashion. The claims are not limited to a two-channel correlator.

A serial data signal (e.g., samples 26, 28, 32, or 34 in FIG. 2) is provided to serial register 108A at input 102A from output 23 (FIG. 1). Register 108A preferably has approximately 288 sample positions for serially storing the samples received at input 102A. Register 108A has parallel outputs provided to circuit 110A. Tap select circuit 110A selects seventy-two samples of the signal stored in register 108A, according to the four modes shown in FIG. 2. Latch 114A stores the seventy-two samples from circuit 110A and provides the samples through select gate circuit 118 and bit mask gate circuit 120 to bit pattern comparator 126. The number of bits, channels, phases, paths, and selections associated with correlator 20 are discussed in exemplary fashion and are not described in a limiting sense. Select gate circuit 118 is controlled by clock and select circuit 124 and selects either outputs from latch 114A or latch 114B. The selected samples are provided through bit mask gate circuit 120, which screens samples in accordance with signals in bit mask register 122 and enables comparison of sample groups from selected bits in the data pattern. The masked samples are compared in comparator 126 to a predetermined bit pattern provided through pattern select gate circuit 128. Pattern select gate circuit 128 chooses a pattern either in register 130A or 130B in response to a control signal provided from circuit 124.

Comparator 126 provides an output signal to match count register 140, count comparator 144, and count comparator 148. The output signal is indicative of the number of samples which match the bit pattern provided by circuit 128. Comparators 144 and 148 compare the output signal to a threshold and generate a match status signal at output 152 if the count signal is above the correlation threshold. Similarly, count comparator 148 compares the count to decorrelation threshold and provides a decorrelation match signal at output 154 if the output signal is below a decorrelation threshold. A decorrelation refers to a signal being the direct opposite or inverse of the data pattern.

The match status and dematch status signals are provided at line 152 and 154, respectively, to multiple status pulse phase processors 200A and 200B. Multiple status pulse phase processor 200A provides a synchronization signal in response to the selected sequence of match status or dematch status pulses. Preferably, the synchronization signal is provided so synchronizer 18 can match the data clock signal to appropriately recover data in recovery register 22 (FIG. 1).

Figure 4:
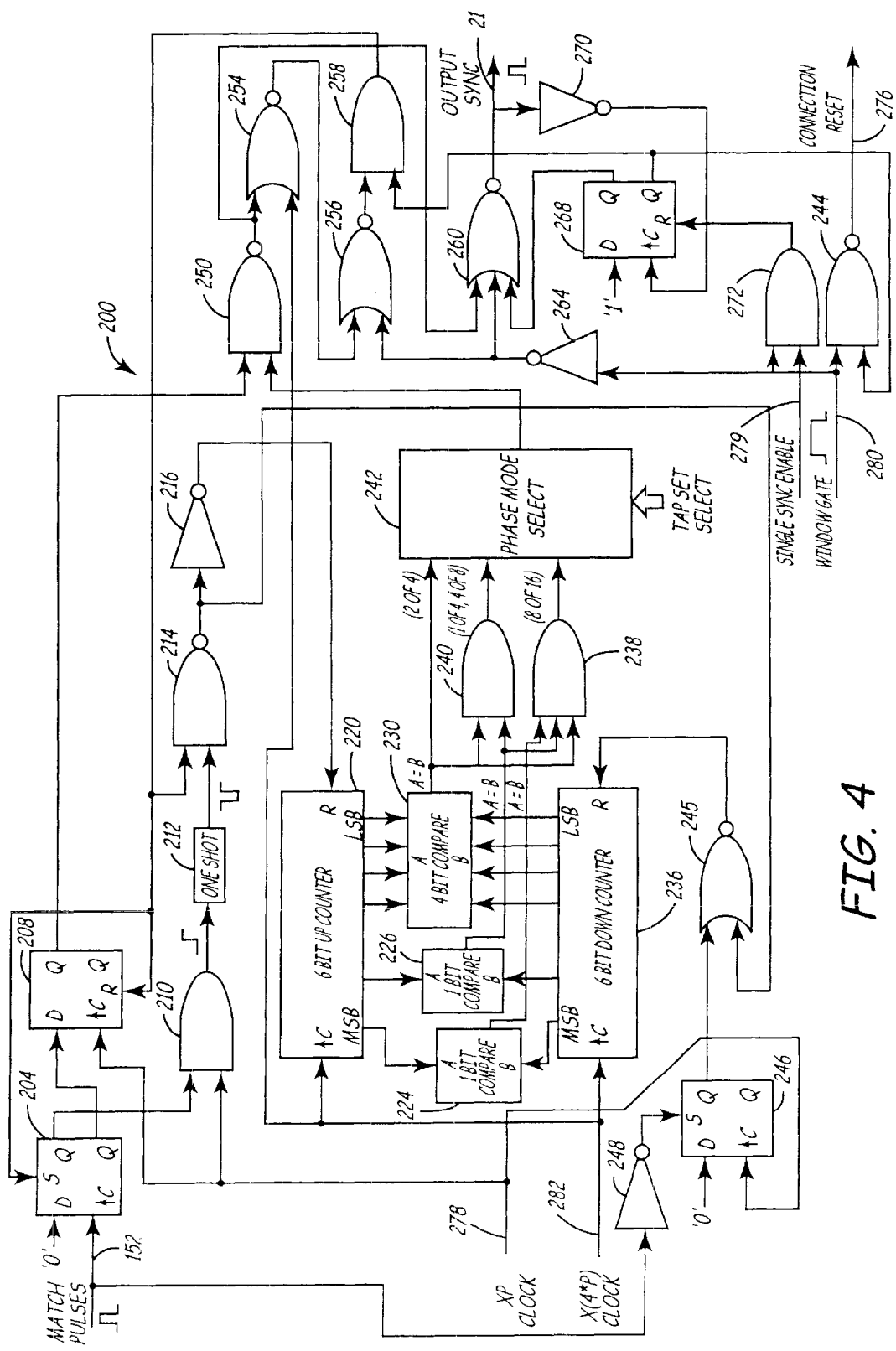
FIG. 4 is a more detailed block diagram of the status pulse phase processor illustrated in FIG. 3, in accordance with still another exemplary embodiment of the present invention.

With reference to FIG. 4, one potential embodiment of multiple status pulse phase processor 200 receives the match (or dematch) status signal at input line 152. The match (or dematch) status signal is typically in the form of one or more pulses. Processor 200 includes a flip flop 204, a flip flop 208, an AND gate 210, a one-shot circuit 212, an AND gate 214, an inverter 216, an AND gate 250, a NOR gate 254, a NOR gate 256, an AND gate 258, a NOR gate 260, an inverter 264, an inverter 270, a flip flop 268, an AND gate 272, and an AND gate 244. Processor 200 also includes an up counter 220, a phase mode select circuit 242, an AND gate 238, an AND gate 240, a NOR gate 245, a down counter 236, a flip flop 246, an inverter 248, a bit compare 224, a bit compare 226, and a 4 bit compare 230.

Processor 200 receives a sampling clock signal input 278 and a counter clock signal at input 282. The counter clock signal has a frequency four times the frequency at the sampling clock signal (the sampling rate associated with sampled phases of the signal at output 24).

Processor 200 includes the components listed above, which are connected substantially as shown in FIG. 4. However, processor 200 is shown as an exemplary embodiment only of a circuit that separates the synchronization signal in response to the match status signal.

The general operation of processor 200 is discussed as follows. A window gate signal is provided at input 280 to indicate processor 200 should analyze the signals at line 152 to determine when to provide a synchronization signal. Additionally, a synchronization enable signal is provided at input 278. The generation of the window gate signal and the synchronization enable signal is beyond the scope of this disclosure and is well understood in the art.

When the synchronization enable signal is provided at input 279, and the window gate signal is provided at input 280, counters 220 and 236 are no longer disabled from counting through inverter 216 and NOR gate 245. A match pulse at line 152 causes flip flop 204 to provide a logic one to flip flop 208. Flip flop 208, in turn, provides a logic one to AND gate 250 at the next pulse of the sampling clock signal at input 278. Flip flop 246 also provides a logic one to NOR gate 245 in response to the match status pulse provided to a set input through inverter 248. NOR gate 245 provides a logic low to counter 236 and resets counter 236.

Counter 236 is clocked by the counter clock signal provided at input 282. Similarly, counter 220 is clocked by the counter signal at input 282. Counter 220 counts up, and counter 236 is maintained at a logic zero until the next transition of the sampling clock signal at input 278. Comparators 224, 226 and 230 can be set for the two-of-four phase mode, one-of-four phase mode four-of-eight phase mode or eight-of-sixteen phase mode.

Comparators 224, 226, and 230 provide a logic one to phase mode select circuit 242 when the output of counter 220 equals the output of counter 236. Phase mode select circuit 242 provides a logic one to AND gate 250 when the outputs of counters 220 and 236 are equal. When AND gate 250 receives a logic one from flip flop 204 and phase mode select circuit 242, a logic zero is provided to NOR gate 254 and to NOR gate 260. Inverter 264 also provides a logic zero to NOR gate 260 when the window gate enable signal is present at input 280. When the synchronization enable signal at input 279 and the window gate signal at input 280 registers the logic one, AND gate 272 resets flip flop 268. Flip flop 268 also provides a logic zero to NOR gate 260.

NOR gate 260 provides a logic one at output 21. When NAND gate 250, inverter 264, and flip flop 268 provide a logic zero, the logic one at output 21 is inverted by invertor 270, which causes flip flop 268 to provide a logic one to NOR gate 260. NOR gate 260 then provides a logic zero at output 21. Therefore, the synchronization signal is provided as a pulse at output 21 when the output counters 220 and 236 are equal.

AND gate 210, one shot circuit 212, AND gate 214, and inverter 216 operate to reset counter 220 in response to the pulse of the synchronization or in response to logic zero of the synchronization enable signal or window gate signal. Flip flop 204 is set, and flip flop 208 is reset, via NOR gate 256 and AND gate 258 when the pulse of the synchronization signal is provided.

With reference to FIGS. 5 and 6, the operation of processor 200 and correlator 20 will be described below as follows. Correlator 20 can be configured to sample a data pattern 24 four times per symbol in accordance with a sampling clock signal 302. If a significant portion of the data samples match, count comparator 144 provides a match status signal 308 at line 152. Window gate signal 306 is provided to input 280 and causes counter 220 and counter 236 to count up and down, respectively, generating count signals 314 and 316 respectively. Counters 220 and 236 count according to a counter clock signal 304 provided at input 282. Counter 220 counts up until match status signal 308 is received. Signal 308 resets counter 220, which begins to count up again in response to signal 304. Match status signal 308 also causes counter 236 to be reset and held at zero until the next up transition of clock signal 302. However, count output 316 is held at zero as status match signal 308 is provided at every four transitions of signal 304.

After a match status pulse 308 is received, counter 220 is no longer reset upon receipt of pulses on signal 308. When the output signals 314 and 316 of counters 220 and 236, respectively, both equal the same count (fourteen), the pulse on synchronization signal 318 is produced at output 21. Connection reset signal 320 is raised high to disable the production of additional pulses on synchronization signal 318. With reference to FIG. 6, the synchronization signal is provided when output signals 314 and 316 both equal ten. Operation is substantially similar to that discussed above with reference to FIG. 5. It is appropriate to point out that the relative location of the output sync pulse 318, with respect to the data pattern 24, is the same in both FIGS. 5 and 6, even though a more noisy signal example in FIG. 6 only generated one match status pulse.

It is understood that, while the detailed drawings, specific examples and particular components given described a preferred exemplary embodiment of the present invention, they are for the purpose of illustration only. The apparatus and method of the invention is not limited to the precise details and conditions disclosed. For example, although a particular logic circuitry is described, other electric connections could be utilized. Further, although particular signals are shown, various signals could be utilized. Thus, changes may be made to the details disclosed without departing from the spirit of the invention which is defined by the following claims.

What is claimed is:

1. A status phase processor for generating a synchronization signal, the synchronization signal synchronizing a data sampling clock, the status processor comprising:

a match status input for receiving a match status signal indicating a pattern match of at least one phase of an incoming to a data pattern; and a control circuit coupled to the match status input, the control circuit including a counter circuit and a logic circuit, the counter circuit comprising an up counter and a down counter performing a count operation in response to a counter signal having a frequency of at least two times the phase rate (sample rate) of the data symbols and in response to the match status signal, the logic circuit generates the synchronization signal in response to the count operation when the down counter has a value equal to the up counter to adjust the data sampling clock in accordance with the match status signal.

2. The status phase processor of claim 1, wherein the match status signal is provided through the logic circuit to a reset input of the up counter and the down counter.

3. The status phase processor of claim 1, wherein the logic circuit includes a window input, wherein the synchronization signal is only generated when a window gate signal is provided at the window input.

4. A status phase processor for use in a data pattern correlator, the data pattern correlator providing a match status signal indicating a pattern match of at least one phase of a incoming signal to a data pattern, the incoming signal being provided in accordance with a data sampling clock, the status phase processor comprising:

an up counter and a down counter performing a count operation in response to a counter signal having a frequency of at least two times the phase rate (sample rate) of the data symbols and in response to the match status signal; and a logic circuit coupled to the up counter and the down counter, the logic circuit controlling the up counter and the down counter and generating the synchronization signal in response to the count operation when the down counter has a value equal to an up counter to adjust the data sampling dock in accordance with the match status signal.

5. The status phase processor of claim 4, wherein the match status signal is provided through the logic circuit to a reset input of the up counter and the down counter.

6. The status phase processor of claims 4, wherein the logic circuit includes a window input, wherein the synchronization signal is only generated when a window gate signal is provided at the window input.

7. A status phase processor for use in a data pattern correlator, the data pattern correlator providing a match status signal indicating a pattern match of at least one phase of an incoming signal to a data pattern, the incoming signal being provided in accordance with a data sampling clock, the status phase processor comprising:

- a counter means for performing a count operation in response to a counter signal having a frequency of at least two times the phase rate (sample rate) of the data symbols and in response to the match status signal said counter means comprising an up counter and a down counter; and

- a logic means for generating the synchronization signal in response to the count operation when the down counter has a value equal to the up counter to adjust the data sampling clock in accordance with the match status signal.

8. The status phase processor of claim 7, wherein the match status signal is provided through the logic means to a reset input of the up counter and the down counter.

* * * * *